(12) United States Patent
Chung et al.

(10) Patent No.: US 11,378,744 B2
(45) Date of Patent: Jul. 5, 2022

(54) INTEGRATED BIPLANE OPTICAL SENSING CORE CHIP

(71) Applicant: POLARIS PHOTONICS LIMITED, Taipei (TW)

(72) Inventors: Hung-Pin Chung, Taipei (TW); Tsung-Yeh Ho, Taipei (TW); Hou-Chung Hung, Taipei (TW); Yin-Wu Chen, Taipei (TW); Sung-Lin Yang, Taipei (TW); Kuang-Hsu Huang, Taipei (TW)

(73) Assignee: POLARIS PHOTONICS LIMITED, Taipei (TW)

( * ) Notice: Subject to any disclaimer, the term of this patent is extended or adjusted under 35 U.S.C. 154(b) by 0 days.

(21) Appl. No.: 17/226,743

(22) Filed: Apr. 9, 2021

(65) Prior Publication Data

US 2021/0325602 A1 Oct. 21, 2021

(30) Foreign Application Priority Data

Apr. 17, 2020 (TW) .................................. 109113111

(51) Int. Cl.
*G02B 6/125* (2006.01)
*G02B 6/126* (2006.01)
*G02B 6/12* (2006.01)

(52) U.S. Cl.
CPC ............. *G02B 6/125* (2013.01); *G02B 6/126* (2013.01); *G02B 2006/12138* (2013.01); *G02B 2006/12142* (2013.01)

(58) Field of Classification Search
None
See application file for complete search history.

(56) References Cited

U.S. PATENT DOCUMENTS

| 6,853,792 B2 | 2/2005 | Logvin et al. |
| 6,961,166 B2 | 11/2005 | Wooten et al. |

(Continued)

FOREIGN PATENT DOCUMENTS

| CN | 2869895 Y | 2/2007 |
| CN | 101216317 B | 12/2010 |

(Continued)

OTHER PUBLICATIONS

Office Action and Search Report for corresponding International Application No. 11020959360/110106567.

(Continued)

*Primary Examiner* — Chad H Smith
(74) *Attorney, Agent, or Firm* — Rosenberg, Klein & Lee

(57) ABSTRACT

An integrated biplane optical sensing core chip has a non-linear optical substrate, a first waveguide structure, a second waveguide structure and a waveguide coupled fiber. The non-linear optical substrate, the first waveguide structure and the second waveguide structure are made of the same nonlinear optical material. The first waveguide structure is connected to the second waveguide structure via a waveguide coupled fiber is outside and independent to the non-linear optical substrate. Therefore, the first waveguide structure and the second waveguide structure can overlap in the vertical direction, and can be set close to each other in the horizontal and vertical directions, so the integrated biplane optical sensing core chip can be miniaturized and can meet reciprocity. The integrated biplane optical sensing core chip is suitable for an optical fiber sensor, and the optical fiber sensor can be a fiber-optic gyroscope or a fiber-optic current sensor.

10 Claims, 6 Drawing Sheets

(56) References Cited

U.S. PATENT DOCUMENTS 9,513,445 B2    12/2016  Cox et al.
2020/0116489 A1 *  4/2020  Wang .................. G01C 19/721

FOREIGN PATENT DOCUMENTS

| CN | 101476889 B | 1/2011 | |
|---|---|---|---|
| CN | 104931036 B | 10/2017 | |
| CN | 105865433 B | 9/2018 | |
| CN | 109579816 A | 4/2019 | |
| EP | 383231 B1 * | 5/1993 | ........... G01C 19/722 |
| JP | 5619750 B2 | 11/2014 | |

OTHER PUBLICATIONS

Special Research Project Achievement Report of National Science Council of Taiwan, Project No. NSC 99-2623-E-008-010-D. "Development of the Multifunction Integrated Optical Modulator in Fiber-Optic Gyroscope(I)." Mar. 2011.

P.G. Suchoski et al. "Low-Loss High-Extinction Polarizers Fabricated in LiNbO3 by Proton Exchange" Optics Letters, vol. 13, No. 2 (Feb. 1988), pp. 172-174.

Office Action and Search Report for corresponding Taiwanese Application No. 109113111, dated Oct. 28, 2020.

* cited by examiner

INTEGRATED BIPLANE OPTICAL SENSING CORE CHIP

BACKGROUND

Technical Field

The present disclosure relates to an integrated optical sensing core chip, and particularly to an integrated biplane optical sensing core chip which is formed by integrating an integrated optical coupler and an integrated electro-optic modulator on a non-linear optical substrate of a single material.

Related Art

A fiber sensor has the advantage of high sensitivity and can be used to measure various changes such as sound, temperature, pressure, angular velocity and magnetic field. For example, it is used in fiber-optic gyroscopes or fiber-optic current sensors. At present, fiber-optic gyroscopes are facing the demand for miniaturization. Therefore, as described in the issued China Patent CN101476889B (hereinafter referred to as document 1), the entire conventional fiber-optic gyroscope is divided into two parts, one part is a front-end sensitive unit which includes a fiber coil, a Y waveguide phase modulator and an optical coupler, and other one part is a back-end processing unit including a signal processing circuit, a light source, a light probing device and a signal input and output interface. In document 1, a length of an optical fiber which connects the front-end sensitive unit with the back-end processing unit is adjusted according to an actual usage situation, so as to miniaturize the front-end sensitive unit. However, this only divides the entire conventional fiber-optic gyroscope into two independent units and then connects them with a fiber. When considering it as a whole, it does not really miniaturize the entire fiber-optic gyroscope.

Regarding the miniaturization of the front-end sensitive unit, as described in the issued China Patent CN101216317B (hereinafter referred to as document 2), the conventional beam splitter (equivalent to the optical coupler in document 1) and the Y waveguide modulator are integratedly arranged on the lithium niobate material substrate to become a multifunctional integrated optical circuit (MIOC), which conforms to the development trend of miniaturization. However, the substrate material of the lithium niobate is a non-linear optical material and causes an imperfect optical waveguide, which leads to possible light leakage. Therefore, a non-reciprocal problem occurs when light waves propagate. In order to solve the problem of non-reciprocity of light waves on the nonlinear optical material, in document 2, the two branch ends of the first Y-branch waveguide with a beam splitter function and the two branch ends of the second Y-branch waveguide acting as the Y-waveguide modulator are deliberately disposed at the same side of the parallelogram chip to form four parallel ports. In other words, the front ends of the two branch ends of the first Y-branch waveguide form a first angle, and the front ends of the two branch ends of the second Y-branch waveguide form a second angle. The opening of the first angle and the opening of the second angle face the same direction, and the end portions of the two branch ends of the first Y-branch waveguide and the end portions of the two branch ends of the second Y-branch waveguide are both parallel. In the same lithium niobate material substrate, an arc waveguide is made to connect the first Y branch waveguide and the second Y branch waveguide to meet the requirements of reciprocity; however, in order to meet the requirements of reciprocity, such a design must limit the curvature radius of the arc waveguide to a specific range, for example, between 2 mm and 6 mm. Compared with document 1 where the Y-waveguide phase modulator and optical coupler are arranged in order from right to left in the horizontal direction, document 2 integrates the conventional beam splitter and the Y-waveguide modulator to shorten the fiber sensor length, but because the opening of the first angle and the opening of the second angle are facing the same direction, the first Y-branch waveguide and the second Y-branch waveguide can only be juxtaposed on the lithium niobate material substrate. The four juxtaposed ports formed on the same side of the chip cause the width of MIOC (the pigtail coupling edge in document 2) to increase. Further, due to the limitation of the curvature radius of the arc waveguide, the end portion of the branch ends of the adjacent first Y branch waveguide and the second Y branch waveguide must maintain a distance of 3 mm-10 mm. As a result, the width of MIOC is further increased. Therefore, document 2 obviously cannot really satisfy the miniaturized fiber sensor whose length and width of MIOC can be reduced at the same time.

In addition, in the issued China Patent CN104931036B (hereinafter referred to as document 3), the opening of the first angle of the first Y branch waveguide and the opening of the second angle of the second Y branch waveguide are directed in opposite directions, but in order to meet the requirement of reciprocity, the first Y-branch waveguide and the second Y-branch waveguide are arranged side by side and extend through the two 90-degree circular arc waveguides with a separated certain distance in both the length direction and the width direction. Compared with document 2, document 3 causes the length and width of the MIOC to increase, so it is actually impossible to realize a miniaturized fiber sensor that can be reduced in length and width at the same time.

SUMMARY

The main objective of the present disclosure is to provide an integrated biplane optical sensing core chip that integrates an integrated optical coupler and an integrated electro-optic modulator on a non-linear optical substrate formed of a single material. The integrated biplane optical sensing core chip of the present disclosure achieves miniaturization, and at the same time meets the requirements of reciprocity and the feasibility of economical mass production of chips.

To achieve the above objective of the present disclosure, an integrated biplane optical sensing core chip of the present disclosure at least comprises a non-linear optical substrate, a first waveguide structure, a second waveguide structure and a waveguide coupled fiber. The first waveguide structure has a first main waveguide and a first branch waveguide on the non-linear optical substrate, wherein the first branch waveguide is formed by a first branch optical waveguide and a second branch optical waveguide, both of which are branched out from the first main waveguide. The first branch optical waveguide and the second branch optical waveguide have a first branch angle therebetween, and the first branch angle has a first opening direction which is a direction of an opening of the first branch angle. The second waveguide structure has a second main waveguide and a second branch waveguide on the non-linear optical substrate, wherein the second branch waveguide is formed by a third branch optical waveguide and a fourth branch optical waveguide, both of which are branched out from the second main waveguide. The third branch optical waveguide and the fourth branch optical waveguide have a second branch angle therebetween, the second branch angle has a second opening direction which is a direction of an opening of the second branch angle, and the second opening direction is parallel to and extends opposite to the first opening direction. The first main waveguide of the first waveguide structure is connected to the second main waveguide of the second waveguide structure via the waveguide coupled fiber.

In one embodiment of the present disclosure, the integrated biplane optical sensing core chip comprises a first region, a second region and a third region, which are sequentially connected in series and extend horizontally. The first branch optical waveguide, the second branch optical waveguide and the second main waveguide are sequentially disposed along a vertical direction within the first region. The first main waveguide, the third branch optical waveguide and the fourth branch optical waveguide are sequentially disposed along the vertical direction within the third region. The first branch optical waveguide, the second branch optical waveguide, the third branch optical waveguide and the fourth branch optical waveguide are sequentially disposed along the vertical direction within the second region.

In one embodiment of the present disclosure, the first branch optical waveguide and the second branch optical waveguide form a first branch portion, the first branch optical waveguide and/or the second branch optical waveguide extend non-horizontally from the first branch portion. The third branch optical waveguide and the fourth branch optical waveguide form a second branch portion, the third branch optical waveguide and/or the fourth branch optical waveguide extend non-horizontally from the second branch portion. The non-linear optical substrate has first side, a second side, a third side and a fourth side, which are sequentially connected in series and in a circular arrangement, and the fourth side is connected to the first side. The first region comprises the first side and the second branch portion, the third region comprises the third side and the first branch portion, the second region is disposed between the first region and the third region, and connected to the first region and the third region, and the second region comprises the second branch portion and the first branch portion.

In one embodiment of the present disclosure, the first branch optical waveguide and the second branch optical waveguide extend non-horizontally from the first branch portion to form two first non-horizontally extending sections, and the first branch angle is formed by intersection of the two first non-horizontally extending sections at the first branch portion. The first branch optical waveguide and the second branch optical waveguide extend horizontally to the first side respectively from the two first non-horizontally extending sections to form two first horizontally extending sections. The third branch optical waveguide and the fourth branch optical waveguide extend non-horizontally from the second branch portion to form two second non-horizontally extending sections, and the second branch angle is formed by intersection of the two second non-horizontally extending sections at the second branch portion. The third branch optical waveguide and the fourth branch optical waveguide extend horizontally to the third side respectively from the two second non-horizontally extending sections to form two second horizontally extending sections.

In one embodiment of the present disclosure, the first horizontally extending section of the first branch optical waveguide, the first horizontally extending section of the second branch optical waveguide and the second main waveguide are sequentially disposed along the vertical direction within the first region. The first main waveguide, the second horizontally extending section of the third branch optical waveguide and the second horizontally extending section of the fourth branch optical waveguide are sequentially disposed along the vertical direction within the third region. The first non-horizontally extending section of the first branch optical waveguide, the first non-horizontally extending section of the second branch optical waveguide, the second horizontally extending section of the third branch optical waveguide and the second horizontally extending section of the fourth branch optical waveguide are sequentially disposed along the vertical direction within a part of the second region which is close to the third region. The first horizontally extending section of the first branch optical waveguide, the first horizontally extending section of the second branch optical waveguide, the second non-horizontally extending section of the third branch optical waveguide and the second non-horizontally extending section of the fourth branch optical waveguide are sequentially disposed along the vertical direction within a part of the second region which is close to the first region.

In one embodiment of the present disclosure, the first main waveguide extends horizontally to the third side to form a first coupling portion, and the second main waveguide extends horizontally to the first side to form a fourth coupling portion. The first main waveguide and the second main waveguide are disposed in parallel. The first coupling portion is connected to the fourth coupling portion via the waveguide coupled fiber which is outside from and independent to the non-linear optical substrate.

In one embodiment of the present disclosure, the first waveguide structure is an integrated optical coupler, and the first main waveguide of first waveguide structure extends through a polarizer disposed on the non-linear optical substrate. The second waveguide structure is an integrated electro-optic modulator, two phase modulators are respectively disposed on two sides of the second horizontally extending section of the third branch optical waveguide of the second waveguide structure, and other two phase modulators are respectively disposed on two sides of the second horizontally extending section of the fourth branch optical waveguide of the second waveguide structure.

In one embodiment of the present disclosure, the first waveguide structure comprises a waveguide polarizer and a waveguide optic divider, the waveguide polarizer is formed in the first main waveguide, and the waveguide optic divider is formed by the first main waveguide, the first branch optical waveguide and the second branch optical waveguide. The second waveguide structure comprises a phase modulator and another one waveguide polarizer, the phase modulator is formed in the second horizontally extending section of the third branch optical waveguide and the second horizontally extending section of the second horizontally extending section, and the other one waveguide polarizer is formed in the second main waveguide. The waveguide polarizer is a polarizer which formed by the self of the first main waveguide, and the other one polarizer is a polarizer which formed by the self of the second main waveguide.

In one embodiment of the present disclosure, an optical barrier structure is disposed between the second branch optical waveguide of the first waveguide structure and the third branch optical waveguide of the second waveguide structure.

In one embodiment of the present disclosure, the first coupling portion and the fourth coupling portion are respectively connected to two ends of the waveguide coupled fiber via two single-core optical fiber module coupling ports.

In one embodiment of the present disclosure, the nonlinear optical substrate, the first waveguide structure and the second waveguide structure are formed by a nonlinear optical material, and the nonlinear optical material is lithium niobate, lithium tantalate or potassium titanyl phosphate, for example, and the present disclosure is not limited thereto.

To sum up, the integrated biplane optical sensing core chip of the present disclosure at least comprises the non-linear optical substrate, the first waveguide structure, the second waveguide structure and the waveguide coupled fiber. The non-linear optical substrate, the first waveguide structure and the second waveguide structure are made of the same non-linear optical material. The first waveguide structure and the second waveguide structure are connected by the waveguide coupled fiber independent of the non-linear optical substrate. The first waveguide structure and the second waveguide structure can be overlapped in the vertical direction, and can be arranged close to each other in both the horizontal and vertical directions, so the integrated biplane optical sensing core chip can be miniaturized and can meet reciprocity. The integrated biplane optical sensing core chip can be applied to a fiber sensor, and the fiber sensor can be a fiber-optic gyroscope or fiber-optic current sensor.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

Figure 1:
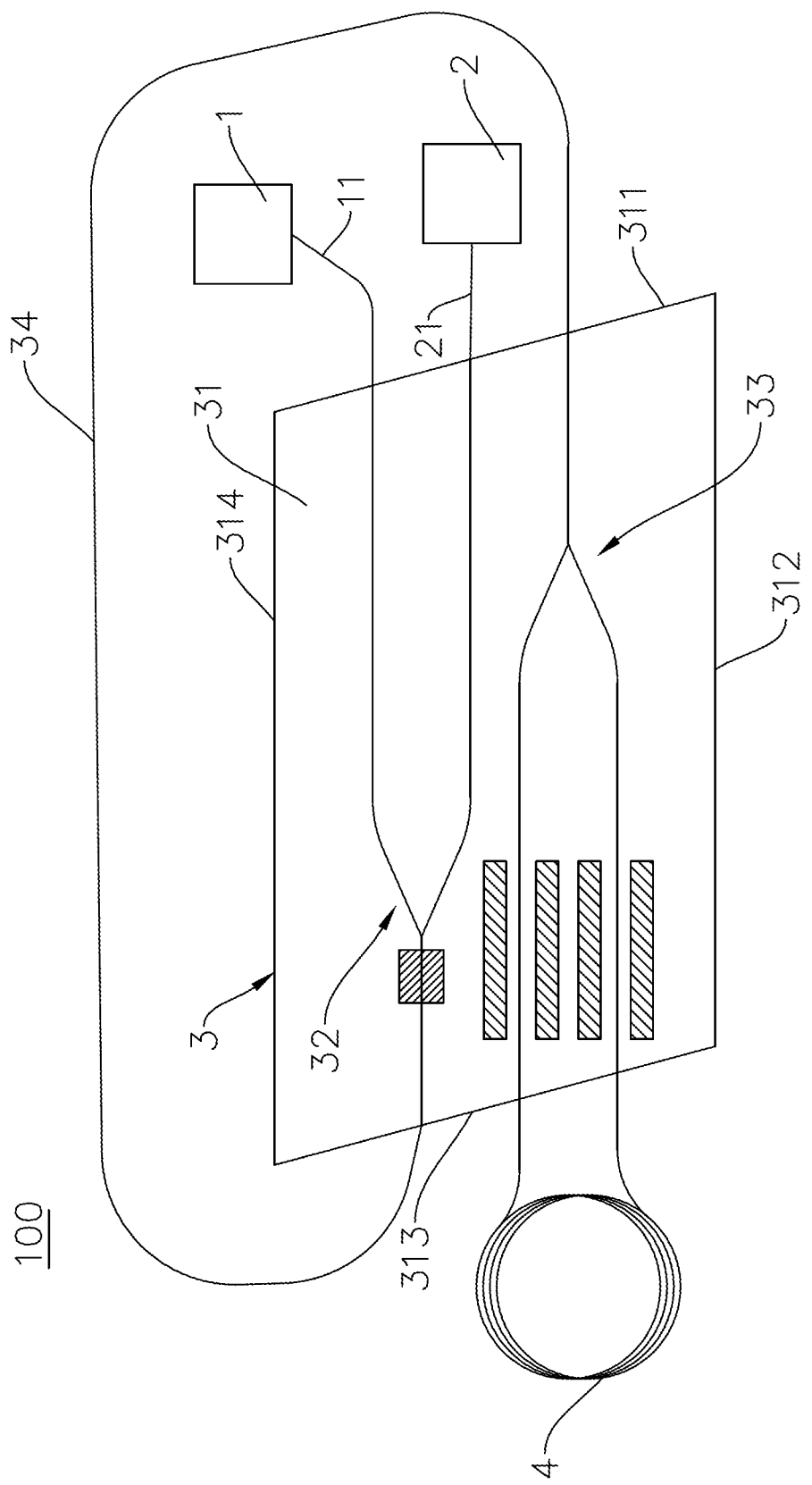
FIG. 1 is a schematic structural diagram showing an integrated biplane optical sensing core chip used in a fiber sensor according to one embodiment of the present disclosure.
Figure 2:
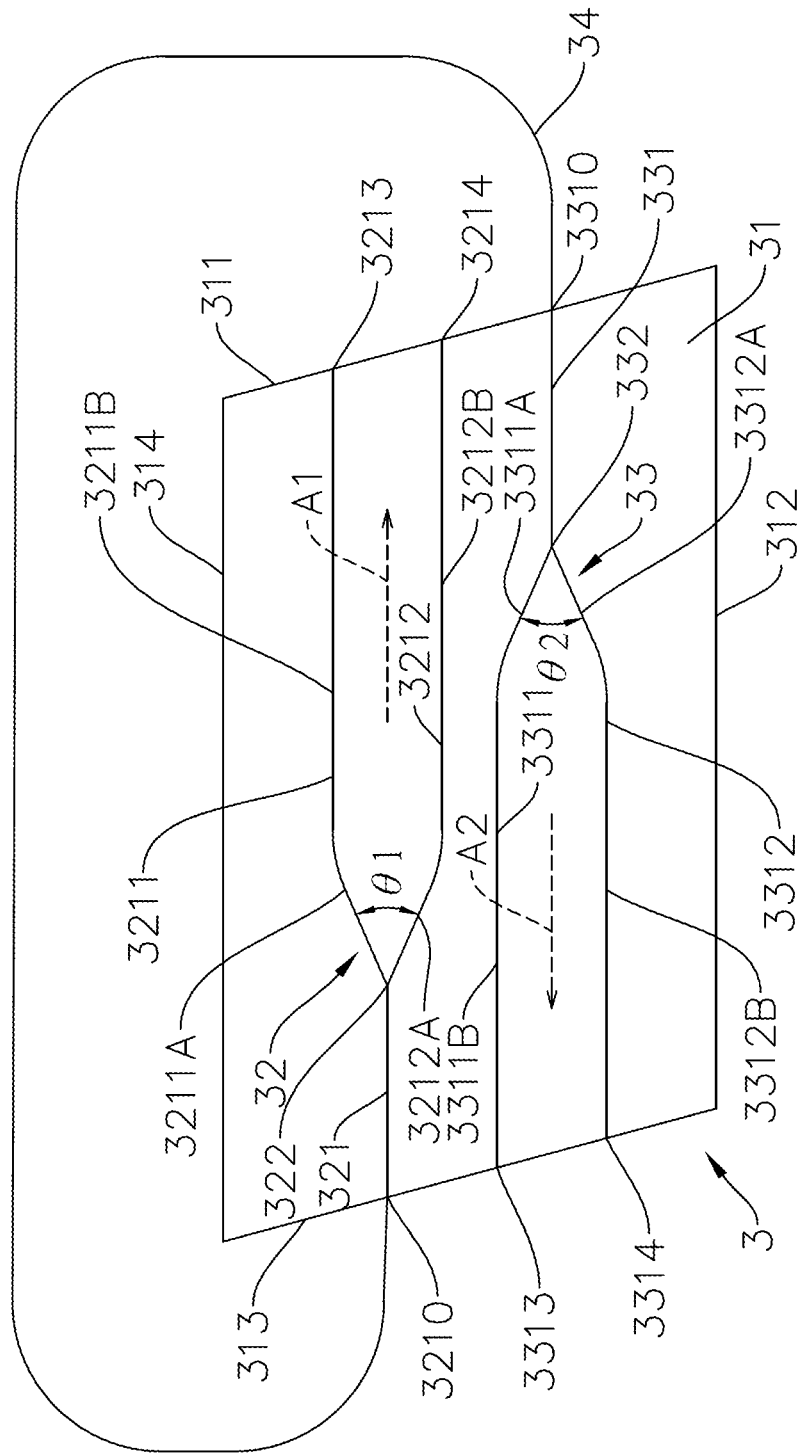
FIG. 2 is a schematic structural diagram of an integrated biplane optical sensing core chip according to one embodiment of the present disclosure.

Firstly, refer to FIG. 1 and FIG. 2, an integrated biplane optical sensing core chip 3 of the present disclosure can be applied in a fiber sensor 100, and the fiber sensor 100 can be a fiber-optic gyroscope or a fiber-optic current sensor. The fiber sensor 100 comprises a light source 1, a detector 2, the integrated biplane optical sensing core chip 3 and an optical-sensing path 4, wherein the light source 1 and the detector 2 are connected to the integrated biplane optical sensing core chip 3 via a light source fiber 11 and a detector fiber 21, respectively. The two ends of the optical-sensing path 4 are connected to the integrated biplane optical sensing core chip 3, and the optical-sensing path 4 may be a ring optical fiber, an optical fiber coil or an optical waveguide loop. The integrated biplane optical sensing core chip 3 includes a non-linear optical substrate 31, a first waveguide structure 32 and a second waveguide structure 33. The non-linear optical substrate 31 may comprise, but is not limited to, a lithium niobate optical substrate, a lithium tantalate optical substrate and a potassium titanyl phosphate optical substrate, or other non-linear optical substrate composed of material with nonlinear characteristics. The non-linear optical substrate 31, the first waveguide structure 32 and the second waveguide structure 33 are made of the same non-linear optical material, preferably lithium niobate. More preferably, the first waveguide structure 32 and the second waveguide structure 33 are formed on the non-linear optical substrate 31 of a lithium niobate optical substrate manufactured by using a conventional photolithography process for lithography and etching. The first waveguide structure 32 and the second waveguide structure 33 may be diffused optical waveguides, ridge optical waveguides or ion exchange optical waveguides. The first waveguide structure 32 and the second waveguide structure 33 respectively comprise an optical waveguide splitting channel and an optical waveguide combining channel, each of which is formed by the corresponding main optical waveguide and the at least two branch optical waveguides branched from the corresponding main optical waveguide. The first waveguide structure 32 and the second waveguide structure 33 may be, but not limited to, Y branch structures, sine branch structures, cosine branch structures, raised sine branch structures, raised cosine branch structures, radius arc branch structures, hyperbolic branch structures or polynomial curve branch structures. In the following embodiments, for the purpose of convenience of description, the first waveguide structure 32 and the second waveguide structure 33 are respectively Y branch structures as examples. For example, the first waveguide structure 32 and the second waveguide structure 33 are Y waveguides respectively.

The shape of the integrated biplane optical sensing core chip 3 is a quadrilateral, such as a parallelogram or a rectangle. Preferably, as in the embodiment in FIG. 1, the shape of the integrated biplane optical sensing core chip 3 is a parallelogram. The non-linear optical substrate 31 has first side 311, a second side 312, a third side 313 and a fourth side 314, which are sequentially connected in series and in a circular arrangement along a clockwise direction, and the fourth side 314 is connected to the first side 311. The first side 311 and the third side 313 are correspondingly arranged in parallel, the second side 312 and the fourth side 314 are correspondingly arranged in parallel, the two ends of the first side 311 are respectively connected to the second side 312 and the fourth side 314, and the two ends of the third side 313 are respectively connected to the second side 312 and the fourth side 314.

Refer to FIG. 2, and the first waveguide structure 32 has a first main waveguide 321 and a first branch waveguide on the non-linear optical substrate 31, wherein the first branch waveguide is formed by a first branch optical waveguide 3211 and a second branch optical waveguide 3212, both of which are branched out from the first main waveguide 321. The first main waveguide 321 extends horizontally to the third side 313 to form a first coupling portion 3210, wherein "extending horizontally" in the embodiment of FIG. 2 means "extending in a direction parallel to the fourth side 314". The first branch optical waveguide 3211 and the second branch optical waveguide 3212 form a first branch portion 322. The first branch optical waveguide 3211 and the second branch optical waveguide 3212 forms first branch angle θ1 at their portions close to the first branch portion 322. An opening of the first branch angle θ1 faces the first side 311. The portions close to the first branch portion mean two first non-horizontally extending sections 3211A 3212A, both of which are respectively extended non-horizontally from the first branch optical waveguide 3211 and second branch optical waveguide 3212. In the embodiment of FIG. 2, the first branch angle θ1 is formed by intersection of the two first non-horizontally extending sections 3211A, 3212A at the first branch portion 322. The direction of the opening of the first branch angle θ1 is a first opening direction A1 which extends toward the right side in the drawings and is parallel to the fourth side 314. The first branch optical waveguide 3211 and the second branch optical waveguide 3212 extend horizontally from the portions away from the first branch portion 322 and respectively form a second coupling portion 3213 and a third coupling portion 3214 on the first side 311. The portions away from the first branch portion 322 mean the first horizontally extending sections 3211B, 3212B, both of which are respectively extended horizontally from the first non-horizontally extending sections 3211A, 3212A of the first branch optical waveguide 3211 and the second branch optical waveguide 3212 to the first side 311.

The second waveguide structure 33 has a second main waveguide 331 and a second branch waveguide on the non-linear optical substrate 31, the second branch waveguide is formed by a third branch optical waveguide 3311 and a fourth branch optical waveguide 3312, wherein the third branch optical waveguide 3311 and the fourth branch optical waveguide 3312 are branched out from the second main waveguide 331. The second main waveguide 331 extends horizontally and forms a fourth coupling portion 3310 on the first side 311. In other words, the first main waveguide 321 and the second main waveguide 331 are arranged in parallel. The third branch optical waveguide 3311 and the fourth branch optical waveguide 3312 form a second branch portion 332. The third branch optical waveguide 3311 and the fourth branch optical waveguide 3312 forms first branch angle θ2 at their portions close to the second branch portion 332. An opening of the second branch angle θ2 faces the first second 313. The portions close to the second branch portion mean two second non-horizontally extending sections 3311A, 3312A, both of which are respectively extended non-horizontally from the third branch optical waveguide 3311 and fourth branch optical waveguide 3312. In the embodiment of FIG. 2, the second branch angle θ2 is formed by intersection of the two second non-horizontally extending sections 3311A, 3312A at the second branch portion 332. The direction of the opening of the second branch angle θ2 is a second opening direction A2 which extends toward the left side in the drawings and is parallel to the fourth side 314. The first third optical waveguide 3311 and the fourth branch optical waveguide 3312 extend horizontally from the portions away from the second branch portion 332 and respectively form a fifth coupling portion 3313 and a sixth coupling portion 3314 on the third side 313. The portions away from the second branch portion 332 mean the second horizontally extending sections 3311B, 3312B, both of which are respectively extended horizontally from the second non-horizontally extending sections 3311A, 3312A of the third branch optical waveguide 3311 and the fourth branch optical waveguide 3312 to the third side 313.

In particular, the first coupling portion 3210 of the first main waveguide 321 of the first waveguide structure 32 and the fourth coupling portion 3310 of the second main waveguide 331 of the second waveguide structure 33 are connected to each other via a waveguide coupled fiber 34 which is outside and independent to the non-linear optical substrate 31. The waveguide coupled fiber 34 is a conventional optical fiber that meets reciprocity. Therefore, even though the first waveguide structure 32 and the second waveguide structure 33 are made of the non-linear material, the integrated biplane optical sensing core chip 3 composed of the non-linear optical substrate 31, the first waveguide structure 32, the second waveguide structure 33 and the waveguide coupled fiber 34 is sufficient to satisfy reciprocity. Compared with the aforementioned documents 2 and 3 mentioned in the prior art, the present disclosure does not require an arc waveguide or two 90-degree arc waveguides, so the first waveguide structure 32 and the second waveguide structure 33 can be arranged close to each other in the horizontal and vertical directions. The integrated biplane optical sensing core chip 3 can be miniaturized. The aforementioned vertical direction refers to the direction parallel to the first side 311.

Figure 3:
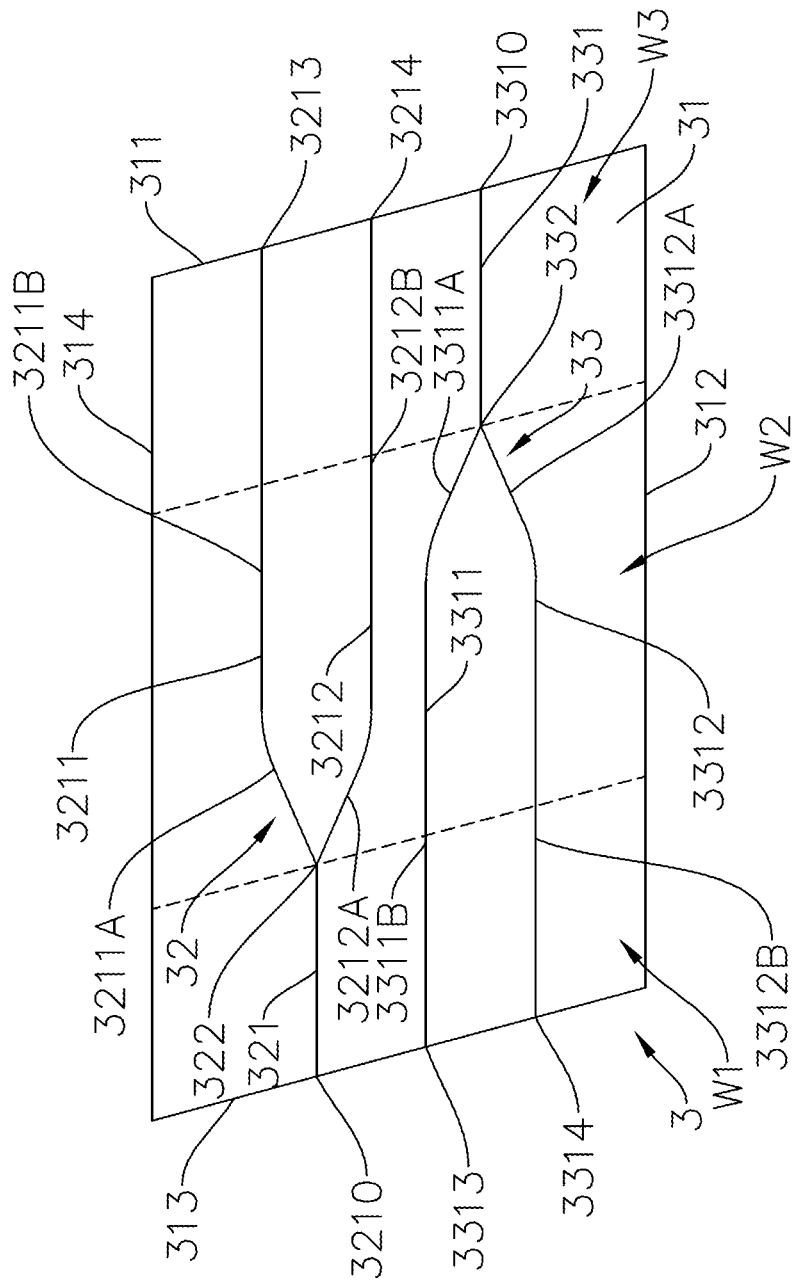
FIG. 3 is a schematic structural diagram of an integrated biplane optical sensing core chip having three regions according to one embodiment of the present disclosure.

Refer to FIG. 3, the integrated biplane optical sensing core chip 3 is divided into three regions, which are a first region W1, a second region W2 and a third region W3. The first region W1, the second region W2 and the third region W3 are sequentially connected in series and extend horizontally. The first region W1 is a parallelogram that comprises the first side 311 and the second branch portion 332, the third region W3 is a parallelogram that comprises the third side 313 and the first branch portion 322, and the second region W2 is disposed between the first region W1 and the third region W3 and connected to the first region W1 and the third region W3. The second region W2 is a parallelogram that comprises the second branch portion 332 and the first branch portion 322. The first horizontally extending section 3211B of the first branch optical waveguide 3211, the first horizontally extending section 3212B of the second branch optical waveguide 3212 and the second main waveguide 331 are sequentially disposed along a vertical direction within the first region W1. The second coupling portion 3213, third coupling portion 3214 and the fourth coupling portion 3310 of the three coupling portions on the first sides 311 are sequentially disposed along the vertical direction. The first main waveguide 321, second horizontally extending section 3311B of the third branch optical waveguide 3311 and the second horizontally extending section 3312B of the fourth branch optical waveguide 3312 are sequentially disposed along the vertical direction within the third region W3. The first coupling portion 3210, the fifth coupling portion 3313 and the sixth coupling portion 3314 of the three coupling portions on the third side 313 are sequentially disposed along a vertical direction. The first non-horizontally extending section 3211A of the first branch optical waveguide 3211, the first non-horizontally extending section 3212A of the second branch optical waveguide 3212, the second horizontally extending section 3311B of the third branch optical waveguide 3311 and the second horizontally extending section 3312B of the fourth branch optical waveguide 3312 are sequentially disposed along the vertical direction within a part of the second region W2 which is close to the third region W3. The first horizontally extending section 3211B of the first branch optical waveguide 3211, the first horizontally extending section 3212B of the second branch optical waveguide 3212, the second non-horizontally extending section 3311A of the third branch optical waveguide 3311 and the second non-horizontally extending section 3312A of the fourth branch optical waveguide 3312 are sequentially disposed along the vertical direction within a part of the second region W2 which is close to the first region W1. Compared with the aforementioned document 1 in the prior art, the first waveguide structure 32 and the second waveguide structure 33 of the present disclosure are vertically overlapped in the second region W2, so the integrated biplane optical sensing core chip 3 can be further miniaturized.

Figure 4:
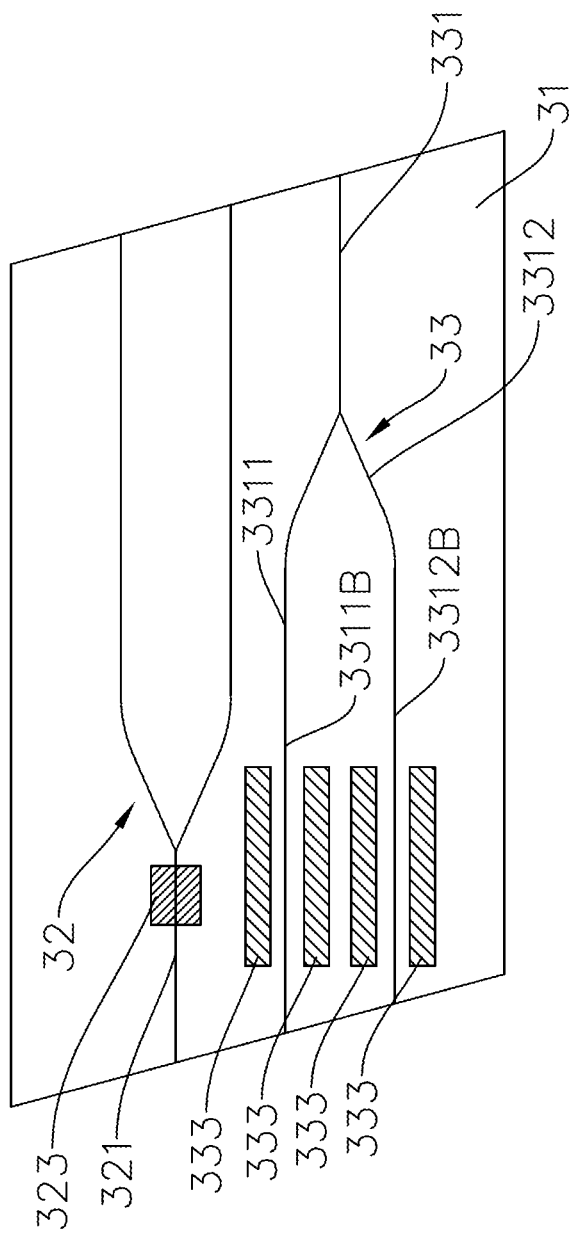
FIG. 4 is a schematic structural diagram of an integrated biplane optical sensing core chip having a polarizer and phase modulators according to one embodiment of the present disclosure.
Figure 5:
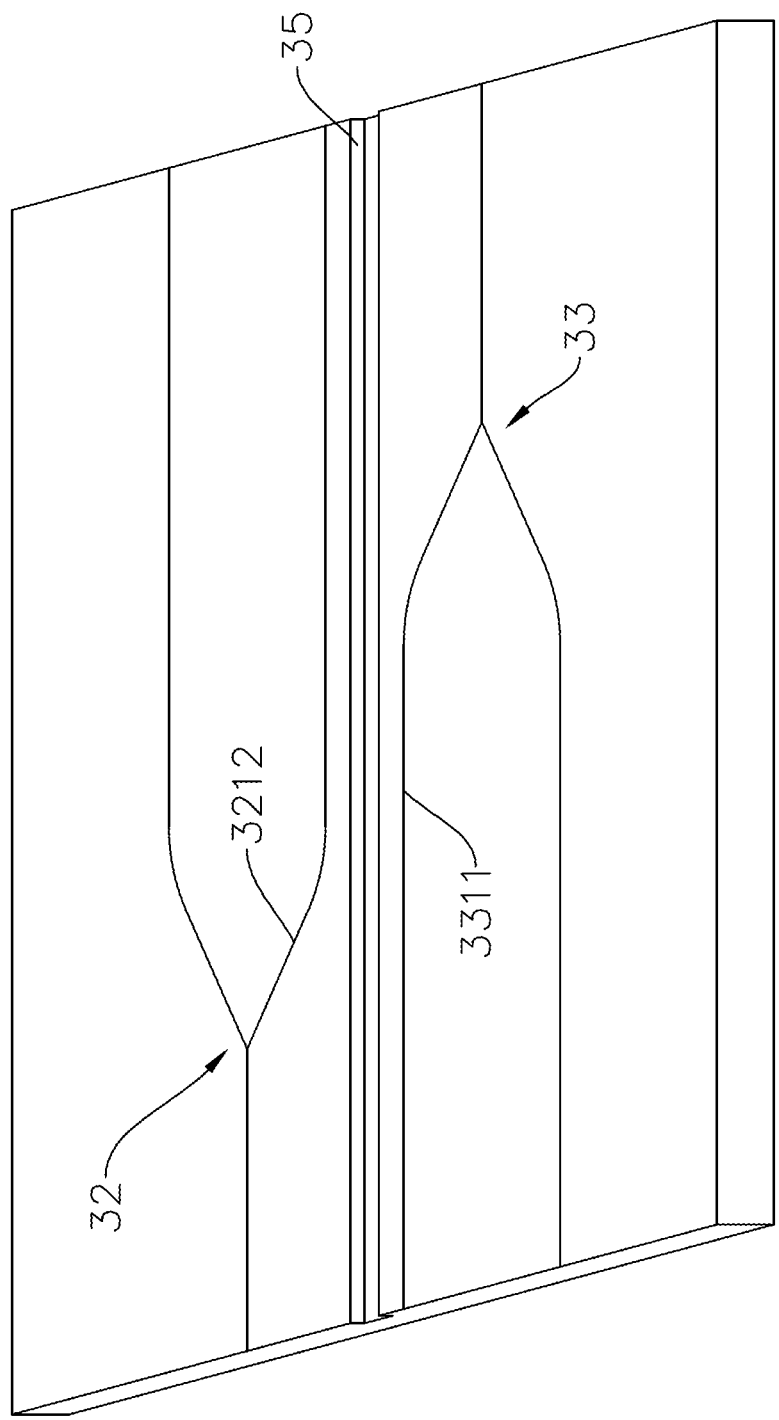
FIG. 5 is a schematic structural diagram of an integrated biplane optical sensing core chip having an optical barrier structure according to one embodiment of the present disclosure.
Figure 6:
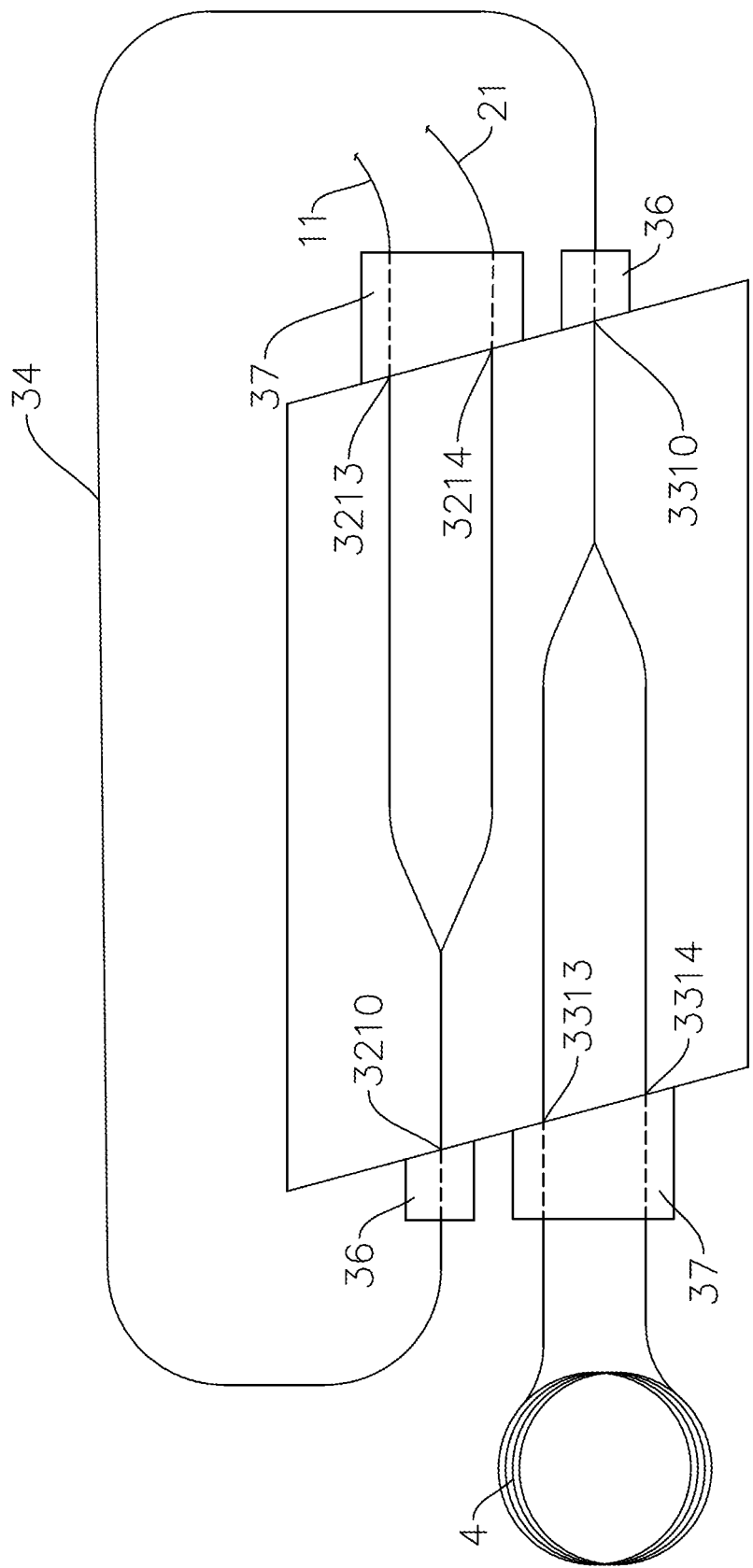
FIG. 6 is a schematic structural diagram of an integrated biplane optical sensing core chip having optical fiber module coupling ports according to one embodiment of the present disclosure.

Refer to FIG. 4, and the first waveguide structure 32 can be an integrated optical coupler, thus the first main waveguide 321 of first waveguide structure 32 extends through a polarizer 323 disposed on the non-linear optical substrate 31, and the first waveguide structure 32 can purify the polarize the light waves. The second waveguide structure 33 can be an integrated electro-optic modulator. Two phase modulators 333 are respectively disposed on two sides of the second horizontally extending section 3311B of the third branch optical waveguide 3311 of the second waveguide structure 33, and other two phase modulators 333 are respectively disposed on two sides of the second horizontally extending section 3312B of the fourth branch optical waveguide 3312 of the second waveguide structure 33. The second waveguide structure 33 can modulate the phases of light waves. Refer to FIG. 5, and an optical barrier structure 35 is disposed between the second branch optical waveguide 3212 of the first waveguide structure 32 and the third branch optical waveguide 3311 of the second waveguide structure 33. The optical barrier structure 35 blocks the interference between the light waves of the first waveguide structure 32 and the light waves of the second waveguide structure 33. The optical barrier structure 35 can be an optical separation channel such as a groove structure or a ridge structure, or an optical isolation absorption mechanism, such as a light absorber or a roughened dispersion surface. In FIG. 5, the optical barrier structure 35 is a groove structure. Refer to FIG. 6, and the first coupling portion 3210 and the fourth coupling portion 3310 are respectively connected to two ends of the waveguide coupled fiber 34 via two single-core optical fiber module coupling ports 36. The second coupling portion 3213 and the third coupling portion 3214 are respectively connected to the light source fiber 11 and the detector fiber 21 via a dual-core optical fiber module coupling port 37. The fifth coupling portion 3313 and the sixth coupling portion 3314 are connected to two ends of the optical-sensing path 4 via another one dual-core optical fiber module coupling port 37.

In particular, the first waveguide structure 32, the second waveguide structure 33 and the polarizer 323 can refer to document 4 (Special Research Project Achievement Report of National Science Council of Taiwan, project number: NSC 99-2623-E-008-010-D, Development of the Multifunction Integrated Optical Modulator in Fiber-Optic Gyroscope (I), Mar. 31, 2011, hereinafter "document 4").

Refer to FIG. 2 again, in other one embodiment, the first waveguide structure 32 comprises a waveguide polarizer and a waveguide optic divider, the waveguide polarizer is formed in the first main waveguide 321, the waveguide optic divider is formed by the first main waveguide 321, the first branch optical waveguide 3211 and the second branch optical waveguide 3212. The second waveguide structure 33 comprises a phase modulator and another one waveguide polarizer, the phase modulator is formed in the second horizontally extending section 3311B of the third branch optical waveguide 3311 and the second horizontally extending section 3312E of the second horizontally extending section 3311B, and the other one waveguide polarizer is formed in the second main waveguide 331. The waveguide polarizer is a polarizer which formed by the self of the first main waveguide 321, and the other one polarizer is a polarizer which formed by the self of the second main waveguide 331, thus without needing additional polarizers. The waveguide polarizer can refer to document 5 (Low-loss high-extinction polarizers fabricated in LiNbO3 by proton exchange, OPTICS LETTERS Vol. 13, No. 2/February 1988, pages 172-174, hereinafter "document 5") for manufacturing.

As can be seen from the above descriptions, compared with the existing documents, in the integrated biplane optical sensing core chip provided by the present disclosure, the first waveguide structure and the second waveguide structure are vertically overlapped in the second region, and there is no need for an arc waveguide or two 90-degree arc waveguides, so the first waveguide structure and the second waveguide structure can be arranged close to each other in the horizontal and vertical directions, and the integrated biplane optical sensing core chip can be miniaturized. Moreover, the first waveguide structure and the second waveguide structure are composed of the nonlinear material, and the integrated biplane optical sensing core chip composed of the non-linear optical substrate, the first waveguide structure, the second waveguide structure and the waveguide coupled fiber as a whole can satisfy reciprocity.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An integrated biplane optical sensing core chip, at least comprising: a non-linear optical substrate, a first waveguide structure, a second waveguide structure and a waveguide coupled fiber; wherein the first waveguide structure has a first main waveguide and a first branch waveguide on the non-linear optical substrate, wherein the first branch waveguide is formed by a first branch optical waveguide and a second branch optical waveguide, both of which are branched out from the first main waveguide, the first branch optical waveguide and the second branch optical waveguide have a first branch angle therebetween, and the first branch angle has a first opening direction which is a direction of an opening of the first branch angle;

the second waveguide structure has a second main waveguide and a second branch waveguide on the non-linear optical substrate, wherein the second branch waveguide is formed by a third branch optical waveguide and a fourth branch optical waveguide, both of which are branched out from the second main waveguide, the third branch optical waveguide and the fourth branch optical waveguide have a second branch angle therebetween, the second branch angle has a second opening direction which is a direction of an opening of the second branch angle, and the second opening direction is parallel to and extends opposite to the first opening direction;

the first main waveguide of the first waveguide structure is connected to the second main waveguide of the second waveguide structure via the waveguide coupled fiber;

the integrated biplane optical sensing core chip comprises a first region, a second region and a third region, which are sequentially connected in series and extend horizontally; the first branch optical waveguide, the second branch optical waveguide and the second main waveguide are sequentially disposed along a vertical direction within the first region; the first main waveguide, the third branch optical waveguide and the fourth branch optical waveguide are sequentially disposed along the vertical direction within the third region; and the first branch optical waveguide, the second branch optical waveguide, the third branch optical waveguide and the fourth branch optical waveguide are sequentially disposed along the vertical direction within the second region; and the first branch optical waveguide and the second branch optical waveguide form a first branch portion, the first branch optical waveguide and/or the second branch optical waveguide extend non-horizontally from the first branch portion; the third branch optical waveguide and the fourth branch optical waveguide form a second branch portion, the third branch optical waveguide and/or the fourth branch optical waveguide extend non-horizontally from the second branch portion; the non-linear optical substrate has first side, a second side, a third side and a fourth side, which are sequentially connected in series and in a circular arrangement, and the fourth side is connected to the first side; and the first region comprises the first side and a part of the second branch portion, the third region comprises the third side and a part of the first branch portion, the second region is disposed between the first region and the third region, and connected to the first region and the third region, the second region comprises other one part of the second branch portion and other one part of the first branch portion.

2. The integrated biplane optical sensing core chip of claim 1, wherein the first branch optical waveguide and the second branch optical waveguide extend non-horizontally from the first branch portion to form two first non-horizontally extending sections, the first branch angle is formed by intersection of the two first non-horizontally extending sections at the first branch portion, the first branch optical waveguide and the second branch optical waveguide extend horizontally to the first side respectively from the two first non-horizontally extending sections to form two first horizontally extending sections; the third branch optical waveguide and the fourth branch optical waveguide extend non-horizontally from the second branch portion to form two second non-horizontally extending sections, the second branch angle is formed by intersection of the two second non-horizontally extending sections at the second branch portion, the third branch optical waveguide and the fourth branch optical waveguide extend horizontally to the third side respectively from the two second non-horizontally extending sections to form two second horizontally extending sections.

3. The integrated biplane optical sensing core chip of claim 2, wherein the first horizontally extending section of the first branch optical waveguide, the first horizontally extending section of the second branch optical waveguide and the second main waveguide are sequentially disposed along the vertical direction within the first region; the first main waveguide, the second horizontally extending section of the third branch optical waveguide and the second horizontally extending section of the fourth branch optical waveguide are sequentially disposed along the vertical direction within the third region; and the first non-horizontally extending section of the first branch optical waveguide, the first non-horizontally extending section of the second branch optical waveguide, the second horizontally extending section of the third branch optical waveguide and the second horizontally extending section of the fourth branch optical waveguide are sequentially disposed along the vertical direction within a part of the second region which is close to the third region, and the first horizontally extending section of the first branch optical waveguide, the first horizontally extending section of the second branch optical waveguide, the second non-horizontally extending section of the third branch optical waveguide and the second non-horizontally extending section of the fourth branch optical waveguide are sequentially disposed along the vertical direction within a part of the second region which is close to the first region.

4. The integrated biplane optical sensing core chip of claim 3, wherein the first main waveguide extends horizontally to the third side to form a first coupling portion, the second main waveguide extends horizontally to the first side to form a fourth coupling portion, the first main waveguide and the second main waveguide are disposed in parallel, the first coupling portion is connected to the fourth coupling portion via the waveguide coupled fiber which is outside from and independent to the non-linear optical substrate.

5. The integrated biplane optical sensing core chip of claim 4, wherein the first waveguide structure is an integrated optical coupler, the first main waveguide of first waveguide structure extends through a polarizer disposed on the non-linear optical substrate; the second waveguide structure is an integrated electro-optic modulator, two phase modulators are respectively disposed on two sides of the second horizontally extending section of the third branch optical waveguide of the second waveguide structure, and other two phase modulators are respectively disposed on two sides of the second horizontally extending section of the fourth branch optical waveguide of the second waveguide structure.

6. The integrated biplane optical sensing core chip of claim 4, wherein the first waveguide structure comprises a waveguide polarizer and a waveguide optic divider, the waveguide polarizer is formed in the first main waveguide, the waveguide optic divider is formed by the first main waveguide, the first branch optical waveguide and the second branch optical waveguide; the second waveguide structure comprises a phase modulator and another one waveguide polarizer, the phase modulator is formed in the second horizontally extending section of the third branch optical waveguide and the second horizontally extending section of the second horizontally extending section, the other one waveguide polarizer is formed in the second main waveguide; the waveguide polarizer is a polarizer which formed by the self of the first main waveguide, and the other one polarizer is a polarizer which formed by the self of the second main waveguide.

7. The integrated biplane optical sensing core chip of claim 5, wherein an optical barrier structure is disposed between the second branch optical waveguide of the first waveguide structure and the third branch optical waveguide of the second waveguide structure.

8. The integrated biplane optical sensing core chip of claim 6, wherein an optical barrier structure is disposed between the second branch optical waveguide of the first waveguide structure and the third branch optical waveguide of the second waveguide structure.

9. The integrated biplane optical sensing core chip of claim 7, wherein the first coupling portion and the fourth coupling portion are respectively connected to two ends of the waveguide coupled fiber via two single-core optical fiber module coupling ports.

10. The integrated biplane optical sensing core chip of claim 1, wherein the non-linear optical substrate, the first waveguide structure and the second waveguide structure are formed by a nonlinear optical material, and the nonlinear optical material is lithium niobate, lithium tantalate or potassium titanyl phosphate.

* * * * *